Dec. 4, 1934.  H. A. BERGERT  1,982,897
RAILWAY TRUCK
Filed June 17, 1932  2 Sheets-Sheet 1
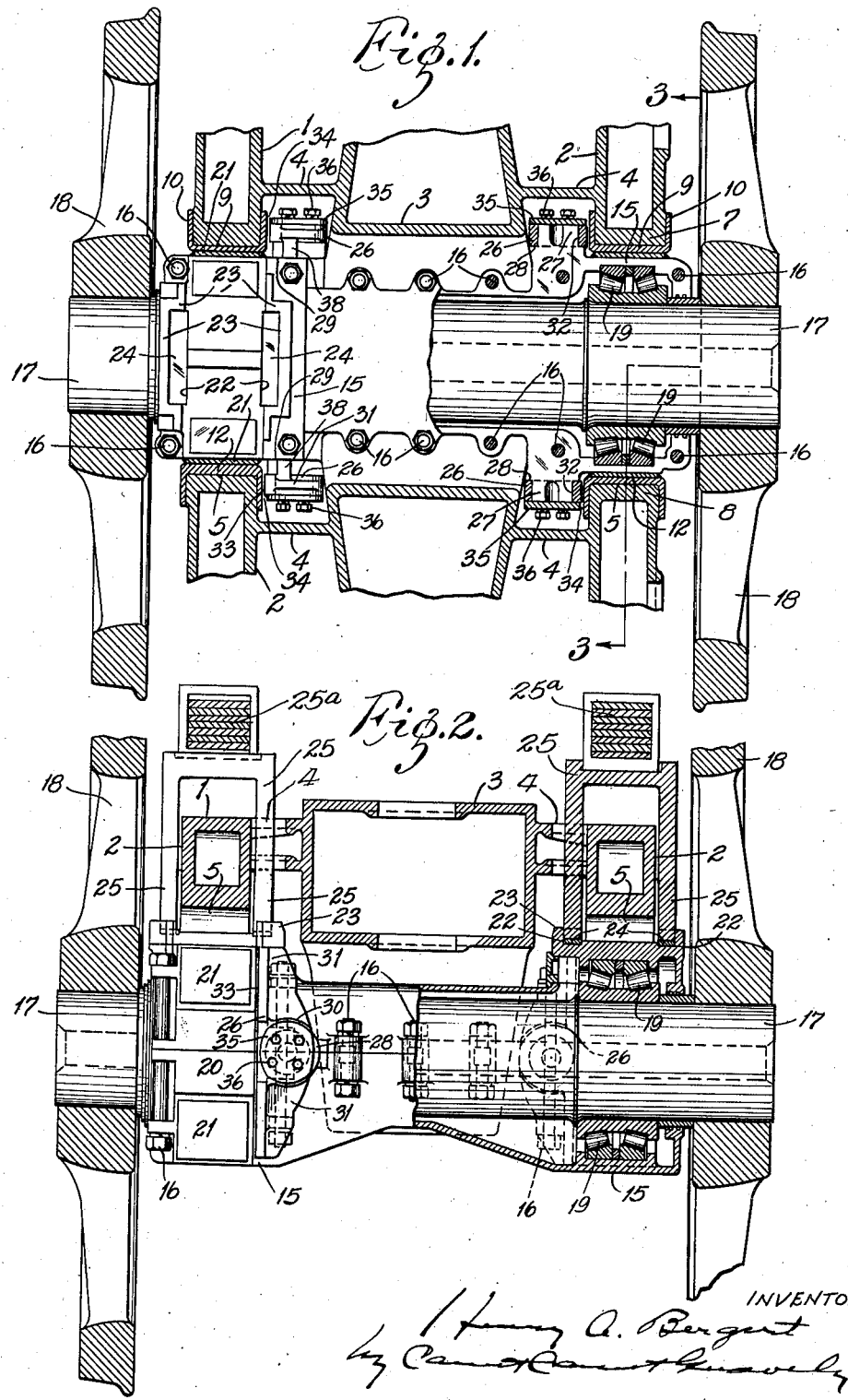

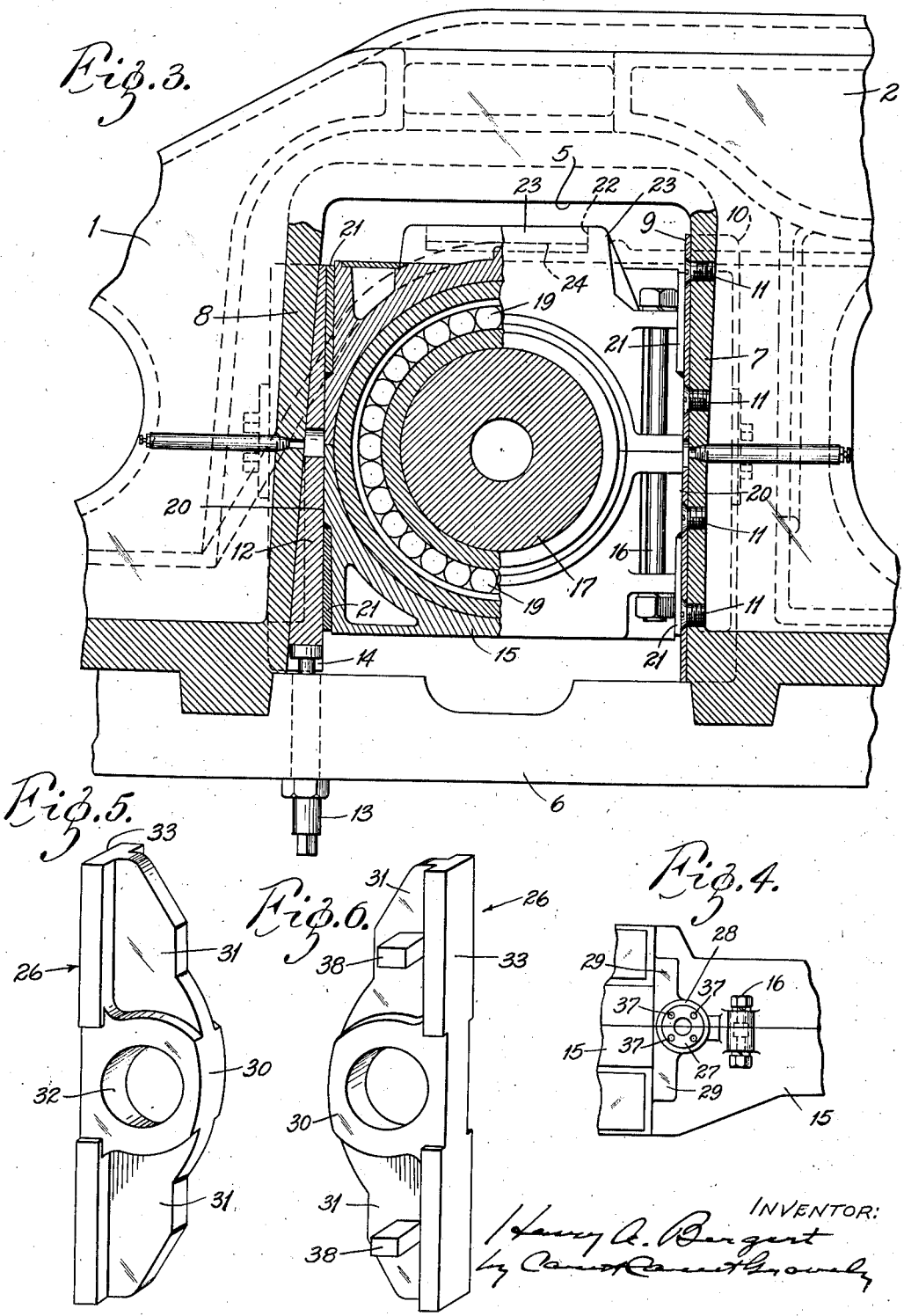

Patented Dec. 4, 1934

1,982,897

UNITED STATES PATENT OFFICE 1,982,897

RAILWAY TRUCK

Henry A. Bergert, Canton, Ohio, assignor to The Timken Roller Bearing Company, Canton, Ohio, a corporation of Ohio Application June 17, 1932, Serial No. 617,741

6 Claims. (Cl. 105—79)

This invention relates to railway trucks, and more particularly to the mounting of the axle housing in the truck frame. It is difficult to install roller bearings in conventional railway truck frames adapted for plain bearings due to the increased size of the roller bearings over the plain ones. In the type of truck construction wherein the journal boxes are provided with trunnions extending laterally from their sides, such as disclosed in Buckwalter Patent No. 1,722,035, it is impossible to fit the roller bearing journal boxes in the standard frame openings without making the openings larger. The principal object of this invention is to provide a roller bearing axle housing construction that can be mounted in a conventional truck frame, adapted for plain bearings, without changing the size of the frame openings, and that will have all the advantages of the trunnion type of axle mounting construction.

The invention consists principally in a railway truck having its axle housing slidably mounted in the side frame openings of the truck for both vertical and transverse movement therein, and having novel thrust plates rockably mounted on the axle housing for vertical oscillation and in position to engage the frame members at the sides of the truck for preventing excessive transverse movement of the axle housing with respect to the frame but allowing it to tilt endwise. It also consists in the arrangements and combinations of parts hereinafter described and claimed.

In the accompanying drawings which form part of this specification and wherein reference numerals refer to like parts wherever they occur, Fig. 1 is a horizontal sectional view along the middle of an axle housing assembly mounted in a railway truck frame in a manner conforming to my invention, with a portion of the axle housing being shown in plan, Fig. 2 is a vertical sectional view along the middle of the construction shown in Fig. 1 with a portion of the axle housing being shown in elevation, Fig. 3 is a sectional view along the line 3—3 in Fig. 1, Fig. 4 is a partial side view of the part of the axle housing located adjacent to the inside of a side frame member of the truck frame, Fig. 5 is a perspective view of a thrust plate looking at one side thereof, and Fig. 6 is a perspective view of a thrust plate looking at the other side.

In the accompanying drawings, I have shown a conventional, integrally cast, railway truck frame 1 comprising side frame members 2 connected to the central bolster member 3 by transverse webs 4. The side frame members have the usual axle housing openings 5 therein defined by pedestals whose bottoms are connected by pedestal tie members 6. The pedestal 7 on one side of each side frame opening extends vertically; whereas the pedestal 8 on the other side thereof is inclined to make the opening wider at its bottom. The vertical pedestal 7 has a channel-shaped frame liner 9 fitted around it with the side flanges 10 of the liner extending along the sides of the pedestal, and the liner 9 is secured to the web of the pedestal by screws 11.

Fitted around the inclined pedestal 8 of each side frame opening is a channel-shaped liner 12 having a wedge-shaped web for cooperating with the pedestal to vary the width of the opening. The liner 12 is held in place and adjusted in the usual manner as by means of a bolt 13 extending through the pedestal tie member and having its upper end portion extending into a recess 14 provided therefor in the bottom of the web portion of the liner.

The construction so far described is of a conventional type adapted for plain bearings; but in the drawings, I have shown a roller bearing axle housing 15 having its end portions mounted in the side openings of the truck frame in a manner conforming to my invention. The housing 15, which is preferably split horizontally and connected together by bolts 16, encloses an axle 17 having wheels 18 rigidly fixed on its ends; and roller bearings 19 are interposed between the end portions of the housing and the axle. The central part of each side of the housing within the frame opening has a rectangularly-shaped flat surface portion 20 which slidably engages the adjacent wear face of the frame pedestal liner; and upper and lower rectangular, flat, trunnion wear pads 21 are welded to the sides of the housing above and below the flat central surface portion 20 for slidably engaging the wear face of the frame liner. The top of each end portion of the housing has a pair of spaced elongated rectangular grooves 22 therein. Both pairs of these grooves extend parallel to the side frame member of the truck frame and are bordered on their ends and their outer sides by upright flanges 23; and pressed in the grooves 22 are flat wear plates 24 constituting seats for conventional saddles 25 which support equalizing springs 25a that are connected to the truck frame in the usual manner (not shown).

In order to prevent excessive transverse movement of the housing without interferring with its free vertical movement, in the construction shown, novel thrust plates 26 are rockably mounted on each side of the axle housing just inside each side portion thereof which slidably engage the frame liner. The thrust plates 26 are mounted on trunnions 27 projecting outwardly from circular bosses 28 which are provided on the sides of the axle housing. The circular bosses project horizontally outward from the sides of the axle housing at the center line of the axle, and the sides of the housing above and below each boss have flat surface portions 29 extending parallel to the flat surface portions at the sides of the axle housing which slidably engage the wear surface of the frame liners. Each thrust plate comprises an enlarged central body portion 30 having an integral upper and lower vertically disposed arm 31 extending therefrom. The central body portion of the plate has a circular opening 32 therethrough for slipping it on its supporting trunnion for oscillation thereon, and the inner side of the thrust plate has a continuous flat surface portion 33 facing the side face of the inside flange of the adjacent frame liner and constituting a thrust surface for engaging the flange of the liner to prevent excessive lateral movement of the axle housing with respect to the frame. Preferably, a slight clearance space 34 is allowed between the thrust surface 33 of each thrust plate and the flange of the frame liner to allow slight movement of the axle housing without straining any parts thereof and to prevent binding action between the housing and frame. Each thrust plate is held on its supporting trunnion by means of a washer plate 35 secured to the trunnion by a series of bolts 36 extending through the washer plate and into threaded holes 37 provided therefor in the end of the trunnion. Both the upper and lower arms 31 of each thrust plate has a rectangular lug 38 extending inwardly therefrom and having a flat end surface portion 39 for slidably engaging the respective flat surface portions 29 at the side of the axle housing above and below the circular boss from which the trunnion, on which the thrust plate is mounted, extends. These lugs 38 prevent the rocker thrust plates from tipping in a lateral direction to prevent binding action between the rocker thrust plates and their supporting trunnions which insures even wear between the trunnions and the thrust plates.

The advantages of my invention are obvious. With my invention, roller bearings may be substituted for plain bearings in a standard plain bearing truck frame without enlarging the frame openings. Moreover, after a conventional truck frame has been equipped with roller bearings in a manner conforming to my invention, the completed structure is extremely flexible and has all the advantages afforded by truck frames which are especially designed for the installation of roller bearings. With my construction, the axle housing is free to move vertically with respect to the frame and it is free to tilt endwise in order to compensate for track irregularities or the like. Furthermore, the rocker thrust plates are readily removable for replacement thereof in case they break, or for other purposes, such as for truing the thrust surface, without removing the entire axle housing from the frame; and my construction has the further advantage over the usual type of construction wherein axle housing trunnions are used in that there is no reversal of stresses in the trunnions.

Obviously, the construction hereinabove described admits of considerable variation without departing from the spirit of my invention. For instance, in truck constructions which are not fitted with channel-shaped frame liners, the rocker thrust plates may be arranged to bear directly against the side frame or suitable members affixed thereon; instead of having the thrust plates located on the inside of the frame, it may be feasible, in some instances, to locate them on the outside thereof; and as numerous other changes may be desirable, I do not wish to be limited to the precise construction shown and described.

What I claim is:

1. A truck comprising side frames each having an opening therein defined by pedestals and a channel-shaped wear liner fitted around one of said pedestals, axle housings having enlarged ends slidably mounted in said openings, wheeled axles extending through and beyond said housings, thrust plates rockably mounted on the sides of said housing inwardly from said pedestals and each having a flat surface portion normally spaced slightly inwardly from said liner and constituting a thrust surface facing the side face of the flange of said wear liner for engaging the same to prevent excessive transverse movement of said axle housing with respect to said side frame.

2. A truck comprising truck side frames having openings therein, axle housings with enlarged end portions mounted in said openings and having trunnions extending laterally therefrom inwardly of said enlarged portions, a rocker thrust plate mounted on each trunnion with clearance normally between said plate and said frame, said plate having a flat thrust surface facing the inner side face of said side frame, and means for preventing said thrust plate from tipping in a direction longitudinally of said trunnion.

3. The combination of a truck side frame having an opening therein, an axle housing in said opening having a trunnion extending laterally therefrom beyond the side of said opening, said axle housing having flat side surface portions above and below said trunnion, and a rocker thrust plate having a trunnion opening therethrough mounted on said trunnion and having a flat thrust surface portion facing the side of said side frame, said thrust plate having two lugs extending therefrom above and below the trunnion opening, respectively, which lugs have flat ends for slidably engaging the flat surface portions on the side of said axle housing to prevent the thrust plate from tipping in a direction longitudinally of the trunnion.

4. The combination of a railway truck having side frames with openings therein, an axle housing having its end portions slidably mounted in said openings, an axle in said housing, wheels fixed on the ends of said axle, roller bearings interposed between the axle and housing, said housing having trunnions extending laterally from its sides on the inside of each side frame, and rocker thrust plates mounted on said trunnions and having flat surface portions facing the inside of the side frames and constituting thrust surfaces for preventing excessive transverse movement of the axle housing with respect to said side frames but permitting it to tilt endwise.

5. A truck comprising side frames having pedestal jaws, axle housings slidably mounted in said jaws for vertical and transverse movement, axles extending through said housings having wheels on the projecting end portions thereof, roller bearings interposed between the ends of said housings and the axles therein, horizontally extending trunnions on said axle housings inwardly of said bearings, and thrust plates pivotally mounted on said trunnions with a side face of each plate close to the inner face of the adjacent pedestal.

6. A truck comprising side frames having pedestal jaws, axle housings with enlarged end portions slidably mounted in said jaws for vertical and transverse movement, axles extending through said housings having wheels on the projecting ends thereof, roller bearings interposed between the enlarged end portions of said housings and the axles therein, horizontally extending trunnions on said axle housings inwardly of said enlarged end portions and thrust plates pivotally mounted on said trunnions with a side face of each plate close to the inner face of the adjacent pedestal.

HENRY A. BERGERT.